US012640826B1

(12) United States Patent
Oyman et al.

(10) Patent No.: US 12,640,826 B1
(45) Date of Patent: May 26, 2026

(54) CHANNEL CLUSTERING IN THE PRESENCE OF INTERFERENCE

(71) Applicant: Amazon Technologies, Inc., Seattle, WA (US)

(72) Inventors: Basak Oyman, Mountain View, CA (US); Bora Karaoglu, San Jose, CA (US); Muhammed Faruk Gencel, Poway, CA (US); Uttam Bhat, Bangalore (IN); Artur Balanuta, San Jose, CA (US); Srikar Potta, Vista, CA (US)

(73) Assignee: AMAZON TECHNOLOGIES, INC., Seattle, WA (US)

( * ) Notice: Subject to any disclaimer, the term of this patent is extended or adjusted under 35 U.S.C. 154(b) by 516 days.

(21) Appl. No.: 18/129,554

(22) Filed: Mar. 31, 2023

(51) Int. Cl.
| | |
|---|---|
| *H04B 17/336* | (2015.01) |
| *H04B 17/318* | (2015.01) |
| *H04L 5/00* | (2006.01) |
| *H04W 64/00* | (2009.01) |

(52) U.S. Cl.
CPC ......... *H04B 17/336* (2015.01); *H04B 17/318* (2015.01); *H04L 5/0012* (2013.01); *H04W 64/00* (2013.01)

(58) Field of Classification Search
CPC .. H04B 17/336; H04B 17/345; H04B 17/318; H04B 17/328; H04B 1/715; H04L 5/0012; H04W 64/00; H04W 64/003
See application file for complete search history.

(56) References Cited

U.S. PATENT DOCUMENTS

| | | | | |
|---|---|---|---|---|
| 6,760,319 B1* | 7/2004 | Gerten | ................... | H04B 1/715 |
| | | | | 370/335 |
| 2005/0270173 A1* | 12/2005 | Boaz | ........................ | H04Q 9/00 |
| | | | | 340/870.02 |
| 2012/0069766 A1* | 3/2012 | Fu | .......................... | H04B 15/00 |
| | | | | 370/332 |
| 2015/0163814 A1* | 6/2015 | Kore | ................. | H04W 72/0446 |
| | | | | 370/330 |
| 2018/0176718 A1* | 6/2018 | VerSteeg | ................... | G01S 5/01 |
| 2018/0352532 A1* | 12/2018 | Patwardhan | .......... | H04W 16/18 |
| 2020/0244306 A1* | 7/2020 | Versteeg | ............. | H04B 1/71632 |
| 2024/0267941 A1* | 8/2024 | Kulkarni | ............. | H04W 28/082 |
| 2025/0202531 A1* | 6/2025 | Elshafie | ................... | H04B 5/79 |

FOREIGN PATENT DOCUMENTS

| | | | | | |
|---|---|---|---|---|---|
| WO | WO-2017126754 A1 * | 7/2017 | ........... | H04W 88/02 |
| WO | WO-2024018416 A1 * | 1/2024 | ........... | H04B 17/328 |

* cited by examiner

*Primary Examiner* — Ayaz R Sheikh
*Assistant Examiner* — Mang Boi Thawng
(74) *Attorney, Agent, or Firm* — K&L Gates LLP

(57) ABSTRACT

In various examples, systems and methods of dynamic channel selection for wireless communication in the presence of interference. In various examples, first interference data for a first gateway device may be determined. In some cases, a wireless transmission scheme may be switched from a static wireless transmission scheme to a frequency hopping wireless transmission scheme based on the first interference data. In some examples, the first gateway device may send first instructions indicating that the first gateway device is switching to the frequency hopping wireless transmission scheme to a first remote computing device.

24 Claims, 8 Drawing Sheets

| | A | B | C | D |
|---|---|---|---|---|
| 1 | C/I vs SNR Look-up Table | Channel Access Scheme Adaptation | BW Adaptation | Condition |
| 2 | $C/I(t) \gg C/I_{th}(t)$ & $SNR(t) \gg SNR_{th}(t)$ | Remain on single channel | Increase BW | both the channel is good and the interference is low |
| 3 | $C/I(t) - C/I_{th}(t) \ll 0$ | Initiate Frequency Hopping | Lower BW to improve immunity to Interference | interference level is very high such that the channel condition does not matter anymore. |
| 4 | $C/I(t) - C/I_{th}(t) \ll 0$ & $SNR(t) \gg SNR_{th}(t)$ | Initiate Frequency Hopping | Increase BW | channel is good but environment interference is high |
| 5 | *SNR represents the desired signal's power relative to the Thermal noise Floor and includes fading impact. Desired signal power can be determined by the de-spreaded RSSI. C/I refers to Channel to interference power ratio.* | | | |

FIG. 2

Channel access and BW adaptation

| | A | B | C | D | E | F | G |
|---|---|---|---|---|---|---|---|
| | Channel access scheme methods | UL Channel Access | IQ direction | Spreading Factor | Bandwidth | (# of orthogonal links) | Comments |
| 1 | | All users use the same channel | All users on same IQ direction | All users are on same SF | All users are on same bandwidth | 1 | most simple channel access scheme but suffers from interference |
| 2 | | All users use the same channel | Users use random IQ direction (up-chirp or down-chirp) | All users are on same SF | All users are on same bandwidth | 2 | Slight improvement on capacity |
| 3 | | All users use the same channel | Users use random IQ direction (up-chirp or down-chirp) | All users are on same SF | n users with good SINR use wider BW, N-n users use default BW | 4 (assuming n=N/2) | intermediate improvement in capacity without changing the channel |
| 4 | | Frequency hopping enabled with X channels | All users are on same SF+on same IQ direction | All users are on same SF | | X | significant improvement on capacity but requires coordination for FH |
| 5 | | Frequency hopping enabled with X channels | Users use random IQ direction (up-chirp or down-chirp) | All users are on same SF | | 2X | |

Orthogonalization of end nodes (with and without changing the channel)

FIG. 3

GW j to determine the path-loss exponent, n, register it to cloud data base
402

Each GW calculates and tracks $d_{EN,GWj}(t)$
404

Each GW finds the number of ENs that are within 500 meters to the itself→ determines group size N
406

Determine the number of channels for the UL-FH as a function of N
408

$N_{GW,j}$ $n_{GW,j}$

Registry at cloud for all GWs j={1,2,...,J}
410

|  | A | B | C | D | E | F | G |
|---|---|---|---|---|---|---|---|
| 1 | Max. Clock drift rate (ppm) | Min. number of preamble symbols required for successful detection | Spreading Factor | Bandwidth [kHz] | Number of preamble symbols in DL | Required keep alive rate (min.) | Power consumption, [mW] [EN,GW] |
| 2 | 200 | 8 | 11 | 500 | 8 | Expected to cause significant PER degradation | |
| 3 | | | | | 12 | 1.37 | [8, 35] |
| 4 | | | | | 23 | 5.12 | [<8, >35] |
| 5 | | | | | 46 | 1.30 | [<8, >35] |

FIG. 6

CHANNEL CLUSTERING IN THE PRESENCE OF INTERFERENCE

BACKGROUND

Wireless communication allows for data communication between different devices without any physical connection between the communicating devices. Wireless communication systems are susceptible to interference, such as co-channel interference or crosstalk from other nearby wireless devices. Such interference can cause information loss, such as packet error, and can increase retransmission which can lead to decreased throughput.

BRIEF DESCRIPTION OF DRAWINGS

FIG. 2 is a table that may be used to dynamically modify channel access and bandwidth, in accordance with various aspects of the present disclosure.

FIG. 3 depicts another example table that may be used for orthogonalization of end node device communication, in accordance with various aspects of the present disclosure.

FIG. 6 depicts an example table that may be used for mitigation of time drift for wireless communication, in accordance with various aspects of the present disclosure.

DETAILED DESCRIPTION

In the following description, reference is made to the accompanying drawings that illustrate several example embodiments of the present invention. It is understood that other examples may be utilized and various operational changes may be made without departing from the scope of the present disclosure. The following detailed description is not to be taken in a limiting sense, and the scope of the embodiments of the present invention is defined only by the claims of the issued patent.

Low Power Wide Area Networks (LP-WAN) are commonly used to enable network communications with power-constrained devices over long distances, e.g. communications from a line-powered device acting as a gateway to a battery-powered device acting as an end node.

In accordance with one or more preferred implementations, an LP-WAN uses a wireless communication protocol that is designed to simplify wireless communication channel access for battery-powered and/or other low-power devices (such as many Internet-of-Things (IoT) devices). In accordance with one or more preferred implementations, to address power consumption concerns, a protocol does not rely on beacons for synchronizing network communication.

This is done to minimize power consumption at the end node devices (ENs) and preserve battery life. In the uplink (UL), the ENs "wake-up" (e.g., power the transmitters of their radios) to transmit packets (uplink data) asynchronously based on the ALOHA protocol or a carrier sense multiple access (CSMA) approach. Each time there is an UL packet received at a gateway device (GW), a new epoch time is created. Instead of having the ENs listen to periodic beacons for synchronization, an UL epoch time is used to align the clock of the Gateway (GW) to a given End Node (EN)'s receive (RX) window. Each RX window at the EN begins at a certain time delta following each UL epoch time. GWs align their DownLink (DL) transmissions to that RX window on a particular channel. In various examples, ENs may be described as remote computing devices with respect to one another and/or with respect to GW devices.

Figure 1:
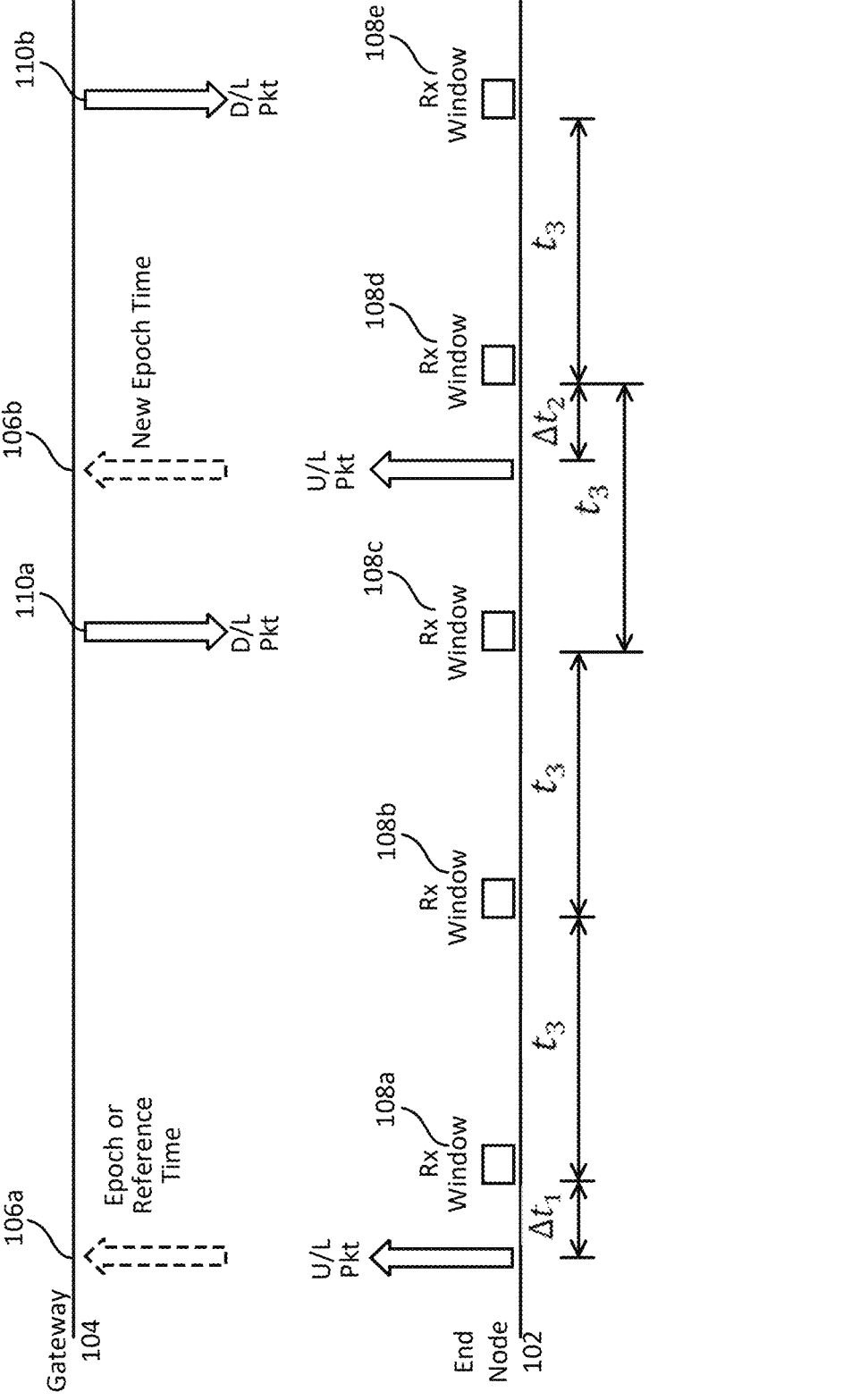
FIG. 1 is a block diagram illustrating an example of interference-aware wireless communication link adaptation, according to various aspects of the present disclosure.

This is illustrated in FIG. 1. For example, as shown in FIG. 1, end node 102 transmits an uplink packet to gateway 104. Gateway 104 registers the received packet at epoch time (e.g., a reference time) 106a. Gateway 104 inspects the packet (e.g., the packet header) to determine a time at which the next RX window (e.g., RX window 108a) will occur. End node 102 may power the receiver of its radio at a constant, but programmable, period $t_3$. However, the time difference between gateway 104 receiving an uplink packet (e.g., at an epoch time) and the time at which the end node 102 powers its receiver may be variable and may be calculated by the gateway 104 based on information included in the uplink packets. For example, the gateway 104 may determine that the next RX window for the end node 102 is after a time period $\Delta t_1$ (e.g., 1 s or any other suitable time, depending on the implementation) following the epoch time 106a for RX window 108a. In the example in FIG. 1, the end node 102 uses a period of $t_3$ (e.g., 5 s or any other suitable time period, depending on the implementation) between RX windows (e.g., RX windows 108a, 108b, 108c, 108d, 108c, etc.). Accordingly, gateway 104 transmits a DL packet 110a during RX window 108c. When the end node 102 transmits a new uplink packet, a new epoch time 106b is registered by the gateway 104. Time period $t_3$, between end node 102 RX windows may be constant, while the time difference between receiving an uplink packet by gateway 104 (e.g., a new epoch time) and the opening of a subsequent RX window by the end node 102 may vary. For example, after receipt of an uplink packet and determining new epoch time 106b, the gateway 104 inspects the received packet and determines the time difference between receipt of the packet and the time at which the next RX window will occur (e.g., RX window 108d) as $\Delta t_2$. In the example of FIG. 1, end node 102 powers the receiver of its radio at a time that is $\Delta t_2$ following the epoch time 106b for RX window 108d. This example process illustrates how end node devices (and particularly power-constrained end node devices, such as battery-powered end node devices) can synchronize wireless communication with gateway devices without power-intensive beaconing.

In an LP-WAN, the number of ENs is typically greater than the number of GWs. Additionally, it is often the case that the ENs are located closer to one another relative to the distance between different GWs. As such, system capacity may be allocated towards UL communication and UL Packet Success Rate may be optimized while minimizing ENs interference with respect to one another. In various examples, DL transmission operation can be optimized through the cloud since GWs are typically configured in communication with a backend cloud computing systems, while ENs typically do not have direct cloud-access.

Described herein are various dynamic channel access techniques for wireless communication networks that operate in the unlicensed ISM band (e.g., 902-928 MHz). The interference in this band typically depends on the environment in which the GW and ENs reside and on the channel at which communication takes place. Quality of Service (QoS) of such networks is significantly impacted by the interference due to unlicensed spectrum usage as well as long airtimes due to low bitrate modulation and coding schemes. Furthermore, LP-WAN networks may operate on a single channel frequency due to hardware limitations (e.g., hardware constraints may result in EN devices that are unable to listen to multiple channels at the same time). In various examples, these EN hardware limitations are by design in order to conserve energy as much as possible at the ENs by maintaining simple channel access schemes.

In various examples, dynamic channel access techniques are described that are affective to change channel access scheme (e.g., transmission schemes) and/or adapt channel bandwidth based on the level of interference observed at each GW. The interference levels are continuously monitored by the GWs. When the per-GW interference prediction algorithm detects a significant rise in the interference in the environment, causing a significant drop in QoS, the various techniques described herein automatically switch to a frequency hopping (FH) scheme. Frequency hopped systems normally rely on a beacon from the GW device. However, various techniques described herein alleviate the need to communicate the hopping scheme to the end node devices, hence maintaining the unsynchronized nature of the LP-WAN protocol. FIG. 2 depicts a table summarizes the dynamic channel access techniques, in accordance with various aspects of the present disclosure.

Three Key Performance indicators (KPIs) that can be useful in predicting a packet success rate (PSR) (e.g., the rate at which transmitted packets are successfully received by a receiver device) in a wireless communication medium are Received Signal Strength (RSS), Carrier-to-Interference ratio (C/I), and Signal to Noise ratio (SNR). RSS may be expressed in units of decibels per milliwatt (dBm), whereas SNR and C/I metrics are relative numbers that may be expressed in the decibel (dB) scale. The RSS depends on the wireless channel and can in some instances be characterized as representing a desired signal's power as detected by the receiver.

For example, a received signal strength indicator (RSSI) value may be determined based on a voltage level from a baseband signal chain before a baseband amplifier. Output from an RSS circuit may be an analog direct current voltage level. This output can be sampled by an analog-to-digital converter (ADC) to determine RSSI values for a given time. A voltage value (in volts) sampled by an ADC may be converted to a power value for a given impedance Z, e.g. $P=V*V/Z$. However, in order to convert this into an RSSI value, it is generally desirable to have this power value expressed in decibels per milliwatt, e.g. $P(dbm)=10*Log$ $10(1000*P)$. Accordingly, a voltage value (in volts) sampled by an ADC may be converted to an RSSI value (in decibels per milliwatt) using, e.g., a formula such as $P(dbm)=10*Log$ $10(1000*V^2/Z)$.

In systems involving end node devices or client devices that communicate with a gateway device that in turn is in communication with a remote computing system or cloud, communications from the end node device or client device to the gateway device and onward to the cloud can be characterized as uplink communications, while communications in the opposite direction from the cloud to the gateway device and onward to the end node device or client device can be characterized as downlink communications.

The thermal noise floor, in dBm, may be calculated as $$n_{th}=-174\text{dBmlHz}+10\ \log_{10}BW+NF, [dBm/BW] \qquad \text{(Eqn-1)}$$

where the Noise Figure (NF), in dB, and bandwidth (BW) in Hz, are known at each GW. The desired signal strength (RSS) can be defined as:

$$RSS=SNR+n_{th}, dBm \qquad \text{(Eqn-2)}$$

the estimate of which is denoted by $RSSI_{true}$, in dBm per signal bandwidth. With any Spread Spectrum Modulations (such as Lora modulation), the $RSSI_{true}$ can be estimated even in the presence of interference according to the processing gain provided.

These estimated KPIs such as NF, desired signal SNR, etc., have errors depending on the chip-to-chip hardware variations and can be calibrated versus temperature, process, voltage, and/or channel frequency.

The GW device's chipset reports the desired signal SNR (in dB) and $RSSI_{true}$ (in dBm) from the packets sent by the ENs. The RSSI is measured by the chipset in the time domain. If a co-channel interferer is present, RSSI contains not only the power of the RSS but also the interference power I(t).

The GW can estimate the interference (to determine estimated interference at the GW) and other noise sources by continuously monitoring the RSSI. Interference may be derived as:

$$I(t)=10\times\log_{10}\{10^{RSSI/10}-10^{(n_{th})/10}\}, dBm \text{ when}$$
$$RSSI>n_{th} \qquad \text{(Eqn-3)}$$

$$C/I(t)-RSS(t)-I(t)=SNR+n_{th}-I(t), [db] \qquad \text{(Eqn-4)}$$

Returning to FIG. 2, the term C/I (t) represents the carrier signal to interference power ratio, represented in dB. The term SNR represents the signal power to thermal noise power ratio, represented in dB. The interference level in the environment is uncorrelated to the thermal noise level and desired signal level at the GW receiver. Hence, the techniques described herein consider not only SNR, but also the C/I levels to make a dynamic decision on the channel access scheme. The terms $C/I_{th}(t)$ and $SNR_{th}(t)$ represent the thresholds (e.g., $C/I_{th}(t)$ represents a threshold interference-specifically a carrier-to-interference threshold and $SNR_{th}(t)$ represents a signal-to-noise ratio threshold) with the selected Modulation and Coding Scheme (MCS) at which a new channel access mechanism is triggered to mitigate interference levels as presented in FIG. 2. When the GW determines that the system is limited by the environment interference (rather than thermal noise), the GW may instruct the EN to switch to frequency hopping. This is determined first by discovering the hardware capabilities of the ENs (as described in further detail below).

Nominally, communication between an EN and the GW is on a single channel. As shown in FIG. 2, this may persist so long as the condition $C/I(t)>>C/I_{th}(t)$ & $SNR(t)>>SNR_{th}(t)$ remains true. This condition indicates that the channel is of good quality and the interference level experienced at the GW is low. The bandwidth may be increased for the single channel when this condition exists.

When the condition $C/I(t)-C/I_{th}(t)<<0$ is true (e.g., the interference level is high), frequency hopping (FH) may be initiated. Control instructions may be sent from the GW device to the EN to instruct the EN to begin frequency hopping (e.g., using the asynchronous LP-WAN protocol depicted in FIG. 1). The number of channels to be included in the FH sequence may be determined as described in further detail below and may also be provided as control instructions. Further, the IQ direction to be used may be communicated as control information (e.g., quadrature signals). Additionally, the set of channels can be used during frequency hopping (once initiated) can be calculated independently by the GW and EN devices, as described in further detail below. This removes the need for the ENs to discover the set of channels and listen to periodic beacons from the GW, further reducing power consumption while enabling frequency hopping when the GW device experiences interference on the single channel. In addition, as shown in FIG. 2, the bandwidth may be lowered to improve immunity to interference.

When the condition $I(t)-C/I_{th}(t)<<0$ & $SNR(t)>>SNR_{th}(t)$ is true, frequency hopping may be initiated (as previously described). Additionally, the bandwidth may be increased as the channel is good, but the environment interference is high.

In accordance with one or more preferred implementations, an LP-WAN utilizes a chirp spread spectrum protocol such as LoRa.

In accordance with one or more preferred implementations, a chirp spread spectrum protocol utilizes chirp signals. An ideal chirp signal can be, for example, a sinusoidal wave whose frequency is increasing linearly over time. An exemplary such chirp signal can be represented, for example, as: $s(t)=c^{\hat{}}(j*2*pi*F(t)*t)$, where $F(t)$ is the constantly increasing frequency.

In accordance with one or more preferred implementations, modulation for a chirp spread spectrum protocol utilizes 500 KHz of bandwidth (BW). For example, consider an implementation at around 915 MHz. An ideal chirp signal might start at 915.0 MHz and linearly increase to 915.5 MHz.

The time it takes to sweep through the 500 KHz depends on a configured parameter that can be characterized as the spreading factor (SF). For a spreading factor of 12 and BW=500 KHz, it takes $\sim2^{\hat{}}SF/BW=8.2$ mS to sweep the frequency. This is also the symbol duration. To encode bits into the symbol, the chirp signal is circularly shifted by one of $2^{\hat{}}SF$ time slots.

At the receiver, a matched filter consisting of a baseline chirp signal is first multiplied by the complex conjugate of the received signal: $r(t)=s(t)*e^{\hat{}}(-j*2*pi*(F(t)+Fs)*t)$, where Fs corresponds to the initial frequency of the chirp signal that is a function of the chirp shift in time. After the matched filter, one gets $r(t)=c^{\hat{}}(-j*2*pi*Fs*t)$, which is simply a tone with frequency of Fs.

A fast Fourier transform (FFT) algorithm is utilized to apply a discrete Fourier transform to this signal. Thereafter, the receiver looks for the frequency bin with maximal energy. The result of the FFT has $2^{\hat{}}SF$ bins which allows each symbol to represent SF total bits. For example, with a BW=500 KHz and SF=12, each 8.2 mS symbol represents 12 bits. Thus, the data rate is approximately equal to $SF/(2^{\hat{}}SF/BW)=1463$ bps.

Consider an implementation with a bandwidth BW, spreading factor SF, and forward error correction (FEC) code rate CR. A chip duration can be calculated as Tc=1/BW seconds. A symbol duration can be calculated as $Ts=2^{\hat{}}SF*Tc$ seconds. A bitrate can be calculated as $p=CR*SF*1/Ts$ bits per second. A chirp rate can be calculated as $u=BW*1/Ts=BW^{\hat{}}2/2^{\hat{}}SF$ hertz per second. A bit energy to noise ratio can be calculated as $Eb/N0=(2^{\hat{}}SF/SF)*SNR$.

The SF determines the number of bits per symbol. Thanks to processing gain provided by the CSS signal processing (this processing gain is denoted by $2^{\hat{}}SF/SF$), the system is able to recover signals below the thermal noise floor. Hence, sensitivity can be achieved with a signal to noise ratio less than 0 dB. For example, the processing gain with SF-11 and SF-8 is 22.6 dB and 15 dB, respectively. The un-modulated transmit signal based on up-chirps with a chirp rate of m can be defined as a function of time as: $s(t)=V\times c^{\hat{}}(j2*pi*((ut/2)-(BW/2))t*c^{\hat{}}(j2*pi*fc*t+theta)$, where 0 is less than or equal to t which is less than or equal to Ts.

The term V represents a desired signal magnitude, which is a constant since the modulation is carried in the frequency domain. Such modulations are referred to as constant envelop modulations. This makes LoRa appealing especially for being able to work with non-linear and efficient power amplifiers. The term fc represents the carrier frequency. The signal is then modulated by the cyclic shift on the base chirp signal containing 2SF chips spanning from -BW/2 Hz to BW/2 Hz. The base chirp, with slope m, wraps around in time within these bounds. When modulated, there are essentially 2SF possible starting points for the chirp to start and eventually wrap around itself. Where the chirp starts (from $-2^{\hat{}}(SF-1)$ and up to $(2^{\hat{}}(SF-1))-1$) carries the information bits (SF bits per symbol). For example, with SF-11, this provides 2048 chips per symbol. The illustrated mapping can be improved with gray coding.

Notably, signals with the same chirp rate are non-orthogonal to each other. In accordance with one or more preferred implementations, for the same chirp rate, orthogonality is achieved by using IQ inversion, (i.e., complex conjugation) of the main chirp used for modulation and demodulation. The IQ inversion means that instead of up-chirping the symbols at the modulator, down-chirping is used and the receivers start demodulating with the opposite up-chirps.

FIG. 3 depicts another example table that may be used for orthogonalization of end node device communication, in accordance with various aspects of the present disclosure. Different degrees of freedom can be achieved by using the combinations of the channel access schemes presented in the table of FIG. 3. Degrees of freedom, in this context, means the number of orthogonal channel accesses that can be provided to users (e.g., ENs). Since ENs wake up (e.g., power their transmitter to send data) at any time in order to transmit, time division duplexing cannot guarantee orthogonality of channel access. In other words, there can be times where multiple ENs wake up to transmit at the same time. Orthogonality can be achieved using other means. For example, orthogonality can be achieved by either changing the channel or by changing the chirp rate. The chirp rate per channel can be changed by simply using a different bandwidth. It can also be achieved by changing the spreading factor. Lastly, changing the chirp direction (up-chirp or down-chirp) (e.g., IQ direction or IQ inversion) can achieve orthogonal channel access even on the same channel. In the table in FIG. 3, the "# of orthogonal links" indicates the degrees of freedom represented. The IQ direction may be provided to end nodes as control information. In various examples, the IQ direction may first be changed for ENs communicating with a given gateway when interference is experienced by that gateway device (e.g., above a first threshold interference level) in order to provide two orthogonal links on a static channel (e.g., a first set of ENs uses an up-chirp IQ direction and a second set of ENs uses a down-chirp IQ direction on the same channel). If the gateway device continues to experience interference (e.g., above the same threshold interference level or above a higher, second threshold interference level) the gateway device may initiate frequency hopping. For example, 5 channels may be allocated using IQ inversion to provide 10 orthogonal channels. In this way, the system may provide preference to changing IQ direction over initiation of frequency hopping (to limit computational complexity). Although not shown in FIG. 3, use of different spreading factors may also be employed to provide link orthogonality.

Figure 4:
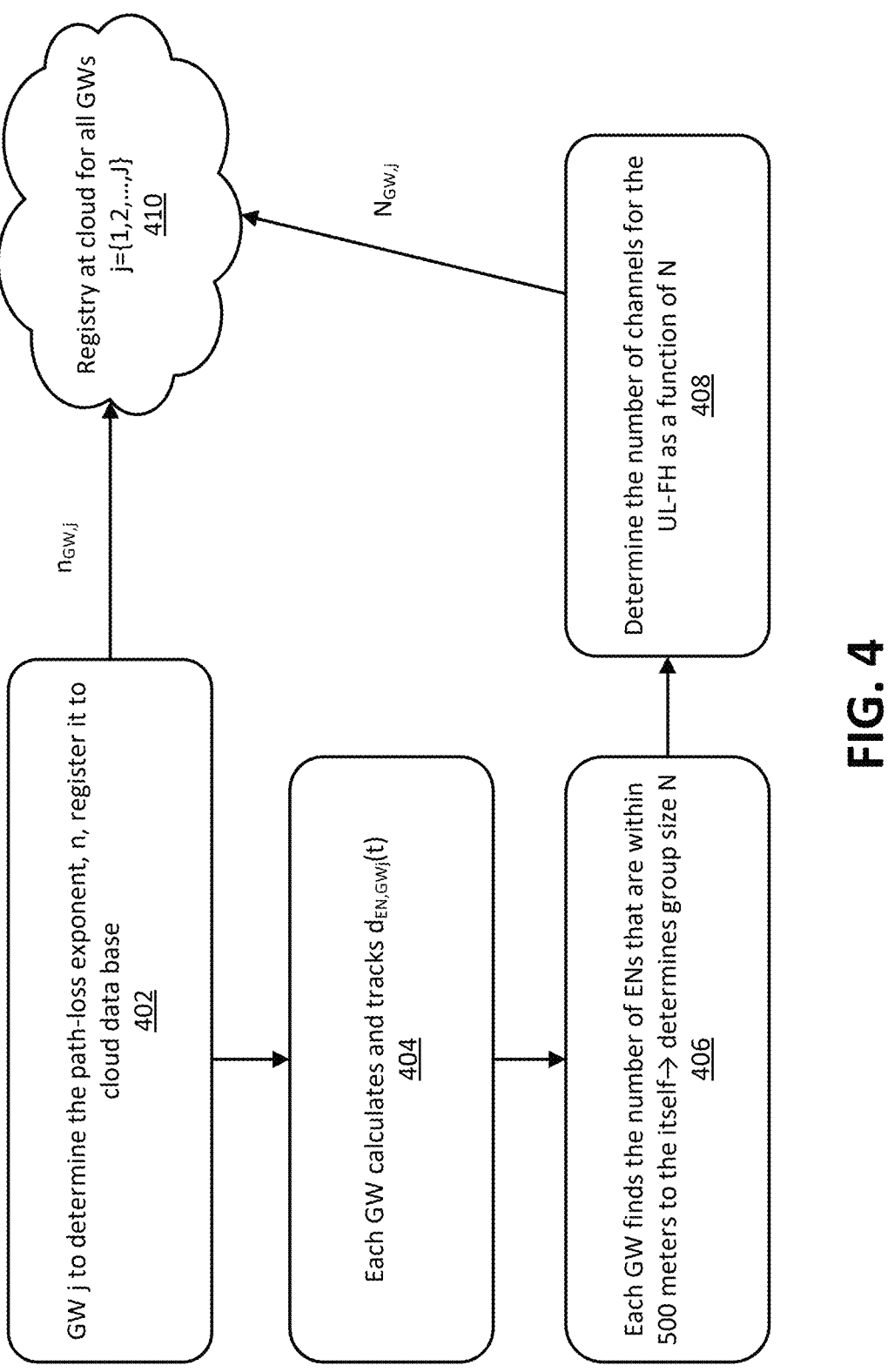
FIG. 4 depicts an example process for determining a number of end node devices located proximately to each gateway device, in accordance with various aspects of the present disclosure.
Figure 5:
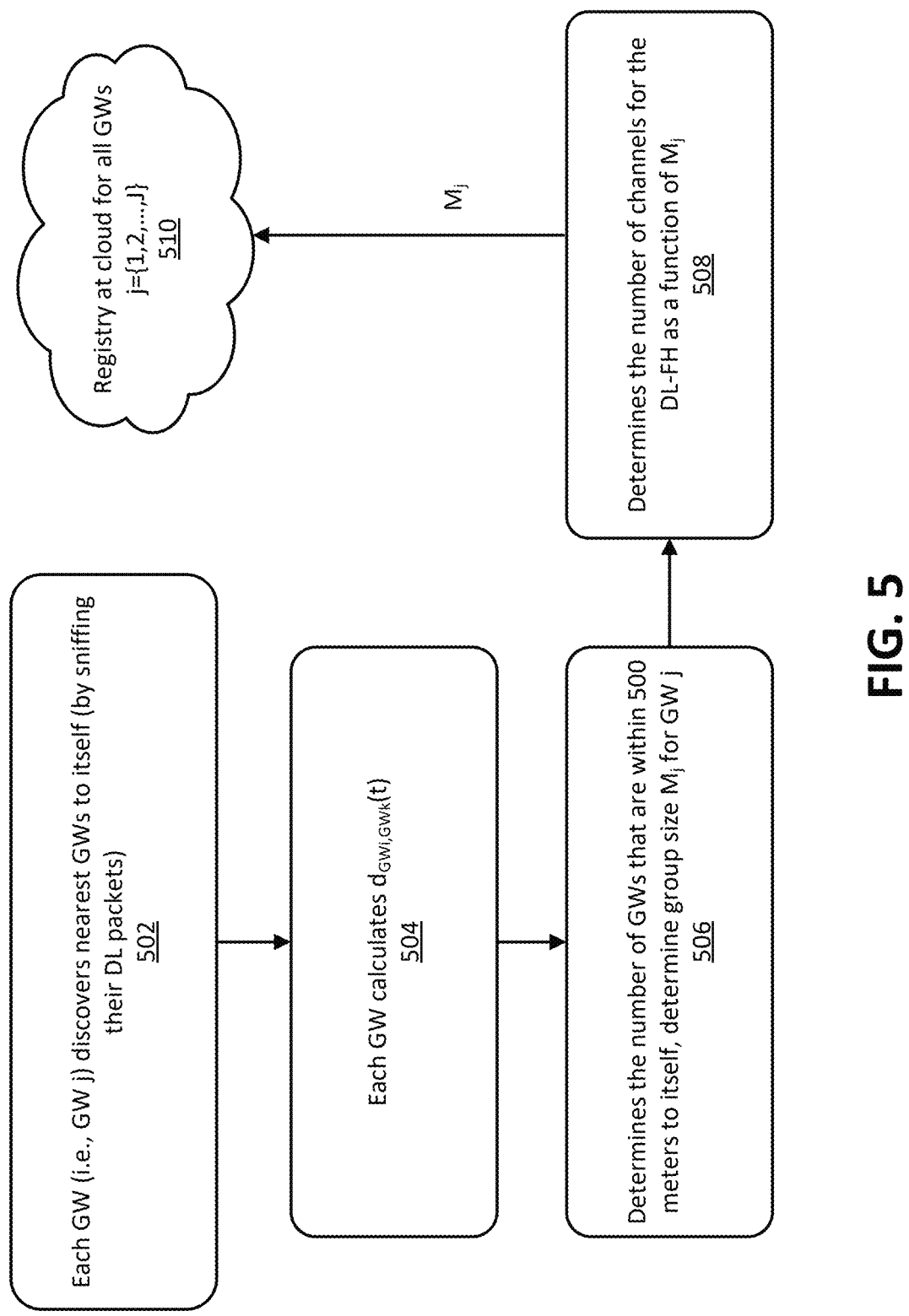
FIG. 5 depicts an example process for determining a number of proximately-located gateway devices for a given gateway device, in accordance with various aspects of the present disclosure.

In various examples, the number of channels that may be used in the frequency hopping sequence may be determined by the individual gateway devices. As described herein, this may be determined by the GWs as they continuously listen and learn the wireless channels, and discover the number of ENs and the number of GWs around them. FIG. 4 describes an algorithm that a GW can use to discover the number of ENs that are located proximately to the GW. FIG. 5 describes an algorithm that a GW can use to discover the number of other GWs that are located proximately to the GW which may be potential interference sources.

At action 402, the GW may continuously monitor (or may monitor at a desired cadence) the RSSI from each EN and uses it to determine the path-loss exponent n in the environment. The path-loss exponent may be calculated using linear-regression with a least squares fit. Using the determined path-loss exponent n and a reference path-loss level that is at a known distance, the GW can determine the distance in between itself and each EN that it receives an UL packet by tracking it's Received Signal Strength (RSS) (action 404). The GW performs this estimation for all the ENs from which it receives an UL packet. The GW may then determine the number of ENs that are within a certain distance to the GW (for e.g., 500 meters is a good rule of thumb for Lora, SF-11 based modulation which can provide good QoS) at action 406. Let this number of nearby ENs be represented by the term $N_{GW_j}$. The number $N_{GW_j}$ is determined by each GW j, where $j \in \{1, 2, 3, \ldots, J\}$ for a total of J GWs. Then each GW sends this number to the cloud for a better centralized decision making and for traffic monitoring. At action 408, the cloud may determine the number of frequencies to frequency hop in the UL as a function of $N_{GW_j}$. For example, if $N_{GW_j}=1$, there is no need to do frequency hopping in the UL. However, if $N_{GW_j} \gg 1$, the FH may be started in UL and the FH size is selected to include at most $N_{GW_j}$ channels. In various examples, $N_{GW_j}$ may be calculated and tracked at each GW in order to adapt to a dynamic network size. The cloud may register the path-loss exponent n and the number of nearby ENs $N_{GW_j}$ for each GW J (action 410).

Similarly, FIG. 5 depicts an example process for determining a number of proximately-located gateway devices for a given gateway device, in accordance with various aspects of the present disclosure. The number of proximately-located gateway devices is referred to as $M_{GW_j}$. $M_{GW_j}$ may be used to determine the number of channels to use in the FH sequence for DL communications. For example, if $M_{GW_j}=1$ then there is no need to do frequency hopping in the DL as there is no nearby GW that can cause significant interference to the desired GW. However, if $M_{GW_j} \rightarrow \gg 1$, then, the FH must be started for DL and the FH size should contain at most $M_{GW_j}$ channels. In various examples, $M_{GW_j}$ may be calculated and registered (action 510) at each GW in order to adapt to dynamic network size. Similar to the operations in FIG. 4, at action 502, each GW may discover the nearest GWs by sniffing their DL packets. Each GW may calculate the distance between itself and each other GW (e.g., $d_{GW_i,GW_k}(t)$) using the sniffed packets at action 504. The number of GWs that are within 500 meters (or some other selected threshold distance) may be determined as the group size $M_j$ at action 506. As previously described, the cloud may determine the number of channels for DL FH as a function of $M_j$ (action 508).

For the UL, it may be assumed that the GWs are capable of hearing multiple channels at the same time. Conversely, the EN operation may be kept very simple (e.g., single channel at a given time) to preserve battery life and to keep the cost of manufacture low.

In an alternate implementation, instead of calculating the distances, the GW can simply check if the average RSS is above sensitivity or not. If above sensitivity, the GW may determine whether the EN is within its coverage or not. Then it can count the number of ENs that can maintain such signal levels. This approach offers simplified calculations (reducing processing time/power).

The channel definition includes the IQ inversion state with Lora modulation to increase the number of channels available in the system. This may be considered to effectively double the number of available channels to better distribute the load. This channel definition allows available capacity to be used in UL and DL homogeneously. This improves the overall QoS in the presence of an unbalanced UL/DL ratio, which is often seen in IoT networks.

Two distributed DL channel-hopping (e.g., frequency hopping) schemes are described herein. A first scheme is based on global clock signals (GCS). A second scheme is based on channel hopping at each wakeup. Advantageously, the proposed channel hopping schemes do not require any additional control packet transfers, such as beacon packets, thereby conserving battery life in the ENs.

In the UL, channel clustering (selection of a set of channels) may be used rather than channel hopping, as the GWs are typically immobile. The cloud (e.g., backend computing devices) can monitor the GW locations and assign a subset of channels for each GW to maximize coverage of all channels in all regions. A pair of GWs that are spaced far apart from one another can be allocated the same subset of channels as they will not be able to hear and/or interfere with each other. This is referred to as frequency "re-use" at different geographic locations. In various examples, different EN devices may be associated with different preference statuses. In such examples, EN devices with higher preference status may be assigned a greater number of channels for communication and/or a set of preferred channels (with less interference) for communication.

The ENs can be given cues for the set of channels on which to randomly transmit each UL packet, or can select the channels using a randomized manner over the entire set of channels. Such methods are described in further detail below.

Described below is an example set of operations that may be used to implement frequency hopping an ENs while minimizing complexity and without requiring beacon packets. It should be noted that various steps may be omitted and/or additional steps may be added, depending on the desired implementation. In various examples, some steps may be performed in a different order apart from what is described below.

1. The cloud may store a map of GW capabilities including information specifying whether each GW supports frequency hopping.
2. Each GW receives and stores the MAC address of each EN served by the GW based on UL packets received from the ENs.
3. The system (e.g., the cloud) allocates dedicated control channel(s) where new devices can communicate with the GW(s) and get information on whether to initiate frequency hopping or to stay on a static channel (e.g., using a static transmission scheme) as well as on the number of channels to use during frequency hopping.

4. The frequency hopping sequence (FHS) may be initialized based on the MAC address of each EN (e.g., based on the last 16 bits or some other suitable portion of the MAC address). This may be used as an initial seed value for the FHS.

5. The FHS may follow a pseudo random sequence (PRS) generation determined using the initial seed value.

6. The EN and the GW are each able to derive the FHS using the initial seed.

7. The GW can instruct its ENs to switch from a static channel to the independently-derived FHS using a few bits of control information on the dedicated control channel(s) as soon as the interference level determined for the GW is elevated beyond the relevant threshold value.

8. The GW independently derives the FHS using the MAC address and thus is aware of which channels on which to listen for communication with a given EN after switching to FH.

9. The algorithm may limit the FHS (once initiated) to a few channels to simplify the unsynchronized approach in the UL.

10. Since there may be multiple GWs in the field within the proximity of a given EN, each GW is aware of the PRS sequence and initial seed value for the given EN.

11. The cloud may select a single GW (e.g., with highest SNR and/or C/I ratio) to send the control information in the DL per EN to initiate FH.

12. The cloud may instruct other GWs that are in wireless communication with a given EN that the access scheme has been switched to FH.

13. The cloud may determine which GWs can communicate with a particular EN based on the EN IDs that are forwarded to the cloud server.

14. Each GW can be selected to serve certain channels/area, alleviating the need to listen on all channels at all times.

15. The distance between each EN and GW can be derived from the RSSI that the GW observes over time from UL packets (e.g., FIG. 4). This information may be registered in the cloud server.

16. The cloud server may group the ENs and map the groups of ENs based on their respective distances (or RSS) to each GW.

17. The intra-network interference to each GW in the UL is mitigated by orthogonal FH sequence among ENs that are grouped to a particular GW.

18. The cloud may allocate orthogonal FH sets to nearby GWs to be used for DL (to mitigate interference).

19. The number of channels within a set of frequencies are determined versus the number of ENs closer to a given GW. For crowded GWs, more frequencies may be used for FH. For less-crowded GWs, the set of frequencies may be reduced to simplify the operation.

20. The inter-network interreference impact is mitigated by following the algorithm displayed in the table of FIG. 2.

21. In the UL, whichever GW successfully receives the packet/channel/EN, the GW sends the packet to the cloud server for application server processing. The cloud server may discard duplicate packets.

22. When interference levels drop at the best GW in the UL, the GW may instruct its ENs to switch back to single channel operation. This decision may be made locally at the GW without involving the cloud server. However, the GW may inform the cloud server so that the cloud can determine if other GWs may use additional channels.

23. The serving GW continues to scan and determine the new static channel based on noise/interference level. The ENs can start operating on the newly-determined static channel when instructed by the GW on the dedicated control channel(s).

24. The ENs in proximity to each GW can be determined using the average de-spreaded RSSI in between the GW and EN as determined in the UL packet reception.

25. The GW sends control information only to the ENs that exhibit a de-spreaded-RSSI>sensitivity.

26. The best GW may be determined by the cloud server before the RX window is opened at the EN. Hence, different GWs may determine the FHS for the DL so that any GW selected by the cloud may use the determined FHS in the DL.

The adaptive channel access techniques described herein alleviate the need to implement periodic beacons from the GWs. It also saves the ENs from needing to discover and power their receivers to receive periodic beacons from the GW. As such, the various designs described herein conserve battery life at the ENs. The channel and time synchronization can be achieved by adding additional preamble symbols from the GW to anticipate for the clock drift issues in case the ENs go inactive over a period of time, depending on hardware performance. For example, FIG. 6 depicts an example table that may be used for mitigation of time drift for wireless communication, in accordance with various aspects of the present disclosure. As more preamble symbols are added for DL packets, power consumption is increased. However, from the EN perspective, power remains constant (e.g., <8 mW in the example of FIG. 6). Furthermore, each time an EN sends an UL packet to a GW, the GW syncs its clock to that EN before it sends a DL packet.

The various channel access scheme adaptations described herein may also be combined with other adaptive Frequency Hopping mechanisms where certain channels are avoided during periods where the channels experience high interference levels. Interference levels on different channels can be monitored and controlled by the GWs depending on their environment. The period at which FH is adapted is based on the environment and is up to the desired implementation by the network operator.

Depending on the modulation used, it might also be beneficial to change the channel bandwidth, as shown and described in reference to FIG. 2. Per regulations, frequency hopped systems may be required to reduce their channel bandwidths. This in turn increases the airtime and hence limits the bit-rate. However, due to reduction in interference levels using the various techniques described herein, such reduction in the physical layer (PHY) bitrate can be improved by improved overall system capacity.

Decentralized DL Channel Hopping

In decentralized low power link layer algorithms (MAC protocols), such as Sidewalk LDR, the end nodes independently select a wake up schedule. As previously described, "waking up" refers to powering a radio of a device in order to transmit and/or listen for wireless signals. The timing of the downlink communication towards end node devices has to follow the wake up schedule selected by the end device. However, due to the decentralized architecture, these protocols operate over a single common channel. As the network load increases, this channel often becomes congested, increasing the PER and hence the latencies in downlink communication.

Described herein are two different channel hopping schemes that use different channels in the downlink in a distributed manner. The first method changes channels based on a GCS. The second method is based on the epoch time. The first method does not add any additional control information to UL packets thereby reducing the payloads to be transmitted. However, the first method creates a fuzzy confidence interval, reducing the number of opportunities where the end node can be reached. The GCS-based method also changes channels less frequently. In the case of a sustained high interference channel, the end nodes using the high interference channels shall experience higher PER for longer durations before the next hopping event.

The second epoch time-based method addresses these shortcomings by changing the channel at every wakeup instance and eliminating the uncertainty in channel change boundaries. However, the epoch time-based method requires additional information to be sent in the packet payload to carry this information. However, both the GCS-based method and the epoch time-based method achieve decentralized and independent channel hopping, through which, the DL channel traffic is distributed across multiple channels leading to reduced PER.

Decentralized Distributed Channel Hopping Based on GCS

Overview:

The central idea in this method is that the channels used in the downlink are changed based on the global network time (GCS) and a pseudo-random frequency hopping pattern independently selected by/assigned to each end-node in the network.

For each wakeup instance, the GCS time may be divided by the channel hop period (CHHopPeriod), to obtain the interval ID (intervalID).

The initial seed of the EN corresponds to hop sequence ID 0.

Each random channel selection needs a seed input and produces a random channel and a transformed seed. This transformed seed corresponds to the input seed of the next intervalID.

For example initial seed, s0, is used with a random number generator to get a random channel, ch0, and the next seed s1. ch0 is used in the first hop interval, such as for the first minute. Then s1 is used as an input to the random number generator to get ch1, and s2. Ch1 is used in the second interval, and so on.

The global network time differences between the transmitters (GWs) and the ENs can potentially lead to channel selection error around the hopping boundary. This is mitigated by skipping the wakeup and transmission instances in the small duration around that boundary. The following Details section describes an example of this algorithm:

Details

End nodes change channels periodically at predetermined times marked based on the global network time. In this scheme the network selects the following global predefined constants:

MaxCHHopTimeDrift: A max GCS time drift definition is made for the GWs and ENs. This is a loose bound that is lower than the wake up period of the ENs, but large enough to cover all possible GCS drifts. For example, with GCS, ms accuracy in the order of 100 ms is achievable. MaxGCS drift can be conservatively set to 1 second (or some other suitable value).

CHHopPeriod: A large hopping period is defined. This period can be arbitrarily large and should be larger than the MaxCHHopTimeDrift. For example, CHHopPeriod may be 10 s or longer.

Each end node selects:

CHHopStart: a random hop start time based on the GCS, namely CHHopStart.

CHHopStartPseudoRandomSeed: This seed can be derived from unique characteristics of the end node such as NodeID, MACID. Absolute uniqueness is not necessary but should provide large degree of difference between nodes.

WakeupPeriod: Wakeup period determines how often the node wake-ups for receptions. Is selectable based on node's properties. CHHopPeriod should be chosen above such that it is larger than largest wakeupPeriod in the network.

WakeupEpochTime: Wakeup epochs indicate the exact time instance the end node has woken up. This is indicated explicitly or implicitly (as in Sidewalk LDR) via each UL transmission. As the time elapses since the last UL reception from an end node, the estimation accuracy for the next wakeup instance increases. Periodic updates may be used to increase accuracy of these estimations.

Using these variables the time interval is divided into following intervals: Deterministic Channel Intervals (DCI):

[HopStart+2*MaxHopTimeDrift, HopStart+1*HopPeriod−2MaxHopTimeDrift]

[HopStart+2*HopPeriod+2*MaxHopTimeDrift, HopStart+2*HopPeriod−2*Max HopTimeDrift]

[HopStart+2*HopPeriod+2*MaxHopTimeDrift, HopStart+3*HopPeriod−2*Max HopTimeDrift]

Fuzzy Channel Intervals (FCI):

[HopStart+1*HopPeriod−2*MaxHopTimeDrift, HopStart+1*HopPeriod+2*Max HopTimeDrift]

[HopStart+2*HopPeriod−2*MaxHopTimeDrift, HopStart+2*HopPeriod+2*Max HopTimeDrift]

For each wakeup instance, the GCS time is divided by the CHHopPeriod to obtain the hop sequence ID. Note that several consecutive wakeup instances may have the same hop sequence ID and hence may match to the same channel.

The EN calculates the channel without considering DCI and FCI operations and performs wakeup at the EN-calculated frequency.

For the transmitter (e.g., the GW in a DL transmission), the channel is calculated in the same manner. However, the transmitter takes into account whether the particular wakeup falls in the DCI or FCI interval. If the wakeup instance of the node happens to be within a DCI, the channel derived for the given intervalID is used for DL transmissions. Note that both end node and the GW are expected to calculate the same pseudo random channel as long as their GCS times are accurate within +/−MaxCHHopTimeDrift of the real network time.

If the wakeup instance of the node happens to be within an FCI, the transmitter cannot assure whether end node uses the channel it calculates. Hence, the GW may simply skip this wakeup instance and attempt transmission in the next wakeup instance falling in the DCI interval.

Decentralized Distributed Channel Hopping Based on Epoch Time

In the epoch time-based method, the EN adds the seed (or a non-deterministic portion of it) that are included in the epoch packets it sends. This additional information (e.g., about 4B-8B of data) is used to derive the channel of the next wakeup.

The GW notes this additional information together with epoch. The GW either stores this pair <epoch time, seed> locally or passes it to the cloud as packet metadata. This pair is used for scheduling upcoming DL packets by the GWs. The cloud returns back the last <epoch time, seed> info coming from the end node. The GW calculates the next wakeup instance based on the epoch time and chooses that as the target wakeup time (TWT). Similarly, it calculates number of wake-ups intervals between epoch time and the TWT. The seed in the pair is transformed that many times (using a random number generator as described above) to derive the channel to be used in the TWT.

Synchronization Scheme for Unsynchronized Receiver Wake-Ups

FIG. 6 depicts the time drift in ms when both the GW and the EN drift at a worst-case rate of +100 ppm, which has been the worst case spec for LoRa devices with spreading factor (SF) 11 [ref. Sx-1262 data-sheet]. The table in FIG. 6 also shows the number of additional preamble symbols needed versus the activity rate of the EN. As shown in FIG. 6, SF-11 requires much less additional preamble symbols as compared to SF-8.

Figure 7:
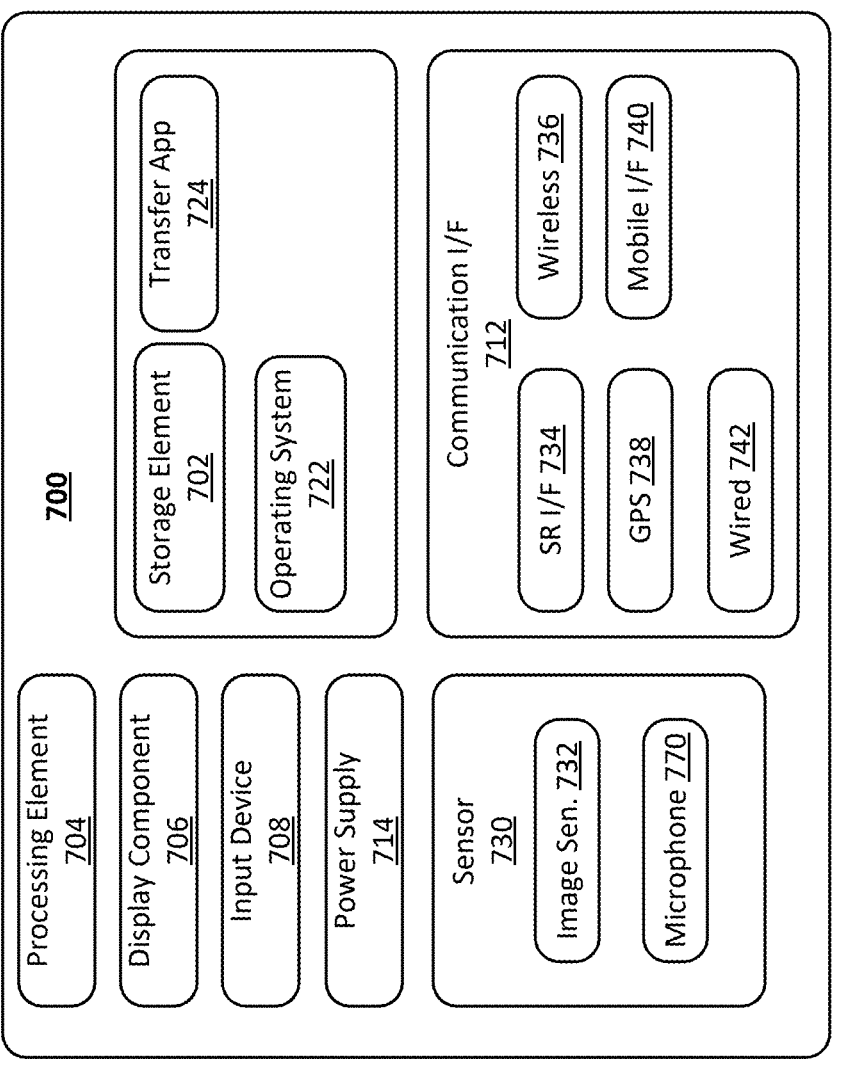
FIG. 7 is a block diagram showing an example architecture of a computing device that may be used in accordance with various aspects of the present disclosure.

FIG. 7 is a block diagram showing an example architecture 700 of a computing device that may be used in accordance with various aspects of the present disclosure. For example, the architecture may perform one or more of the dynamic channel selection techniques described above in reference to FIGS. 1-6. In various other examples, one or more components of the architecture 700 may be included in an end node device or a gateway device. It will be appreciated that not all devices will include all of the components of the architecture 700 and some user devices may include additional components not shown in the architecture 700. The architecture 700 may include one or more processing elements 704 for executing instructions and retrieving data stored in a storage element 702. The processing element 704 may comprise at least one processor. Any suitable processor or processors may be used. For example, the processing element 704 may comprise one or more digital signal processors (DSPs). The storage element 702 can include one or more different types of memory, data storage, or computer-readable storage media devoted to different purposes within the architecture 700. For example, the storage element 702 may comprise flash memory, random-access memory, disk-based storage, etc. Different portions of the storage element 702, for example, may be used for program instructions for execution by the processing element 704, storage of images or other digital works, and/or a removable storage for transferring data to other devices, etc.

The storage element 702 may also store software for execution by the processing element 704. An operating system 722 may provide the user with an interface for operating the computing device and may facilitate communications and commands between applications executing on the architecture 700 and various hardware thereof. A transfer application 724 may be configured to receive images, audio, and/or video from another device (e.g., a mobile device, image capture device, and/or display device) or from an image sensor 732 and/or microphone 770 included in the architecture 700.

When implemented in some user devices, the architecture 700 may also comprise a display component 706. The display component 706 may comprise one or more light-emitting diodes (LEDs) or other suitable display lamps. Also, in some examples, the display component 706 may comprise, for example, one or more devices such as cathode ray tubes (CRTs), liquid-crystal display (LCD) screens, gas plasma-based flat panel displays, LCD projectors, raster projectors, infrared projectors or other types of display devices, etc. As described herein, display component 706 may be effective to display input images generated in accordance with the various techniques described herein. In various examples, the display component 706 may be a wearable display (e.g., in a headset, goggles, and/or glasses) that may display the various graphical highlight data, graphical navigational hints, text, other graphical data, etc., described herein. In some examples, the architecture 700 may include one or more speakers effective to output audio.

The architecture 700 may also include one or more input devices 708 operable to receive inputs from a user. The input devices 708 can include, for example, a push button, touch pad, touch screen, wheel, joystick, keyboard, mouse, track-ball, keypad, light gun, game controller, or any other such device or element whereby a user can provide inputs to the architecture 700. These input devices 708 may be incorporated into the architecture 700 or operably coupled to the architecture 700 via wired or wireless interface. In some examples, architecture 700 may include a microphone 770 or an array of microphones for capturing sounds, such as voice requests. In various examples, audio captured by microphone 770 may be streamed to external computing devices via communication interface 712.

When the display component 706 includes a touch-sensitive display, the input devices 708 can include a touch sensor that operates in conjunction with the display component 706 to permit users to interact with the image displayed by the display component 706 using touch inputs (e.g., with a finger or stylus). The architecture 700 may also include a power supply 714, such as a wired alternating current (AC) converter, a rechargeable battery operable to be recharged through conventional plug-in approaches, or through other approaches such as capacitive or inductive charging.

The communication interface 712 may comprise one or more wired or wireless components operable to communicate with one or more other computing devices. For example, the communication interface 712 may comprise a wireless communication module 736 configured to communicate on a network, according to any suitable wireless protocol, such as IEEE 802.11 or another suitable wireless local area network (WLAN) protocol. A short range interface 734 may be configured to communicate using one or more short range wireless protocols such as, for example, near field communications (NFC), Bluetooth, Bluetooth LE, etc. A mobile interface 740 may be configured to communicate utilizing a cellular or other mobile protocol. A Global Positioning System (GPS) interface 738 may be in communication with one or more earth-orbiting satellites or other suitable position-determining systems to identify a position of the architecture 700. A wired communication module 742 may be configured to communicate according to the USB protocol or any other suitable protocol.

The architecture 700 may also include one or more sensors 730 such as, for example, one or more position sensors, image sensors, and/or motion sensors. An image sensor 732 is shown in FIG. 7. Some examples of the architecture 700 may include multiple image sensors 732. For example, a panoramic camera system may comprise multiple image sensors 732 resulting in multiple images and/or video frames that may be stitched and may be blended to form a seamless panoramic output. An example of an image sensor 732 may be a camera configured to capture color information, image geometry information, and/or ambient light information. In various examples, the image sensor 732 may be effective to capture image and/or video frames that may be used to detect the various objects in the physical environment of the user.

As noted above, multiple devices may be employed in a single system. In such a multi-device system, each of the devices may include different components for performing different aspects of the system's processing. The multiple devices may include overlapping components. The components of the various computing device(s), as described herein, are exemplary, and may be located as a stand-alone device or may be included, in whole or in part, as a component of a larger device or system.

Figure 8:
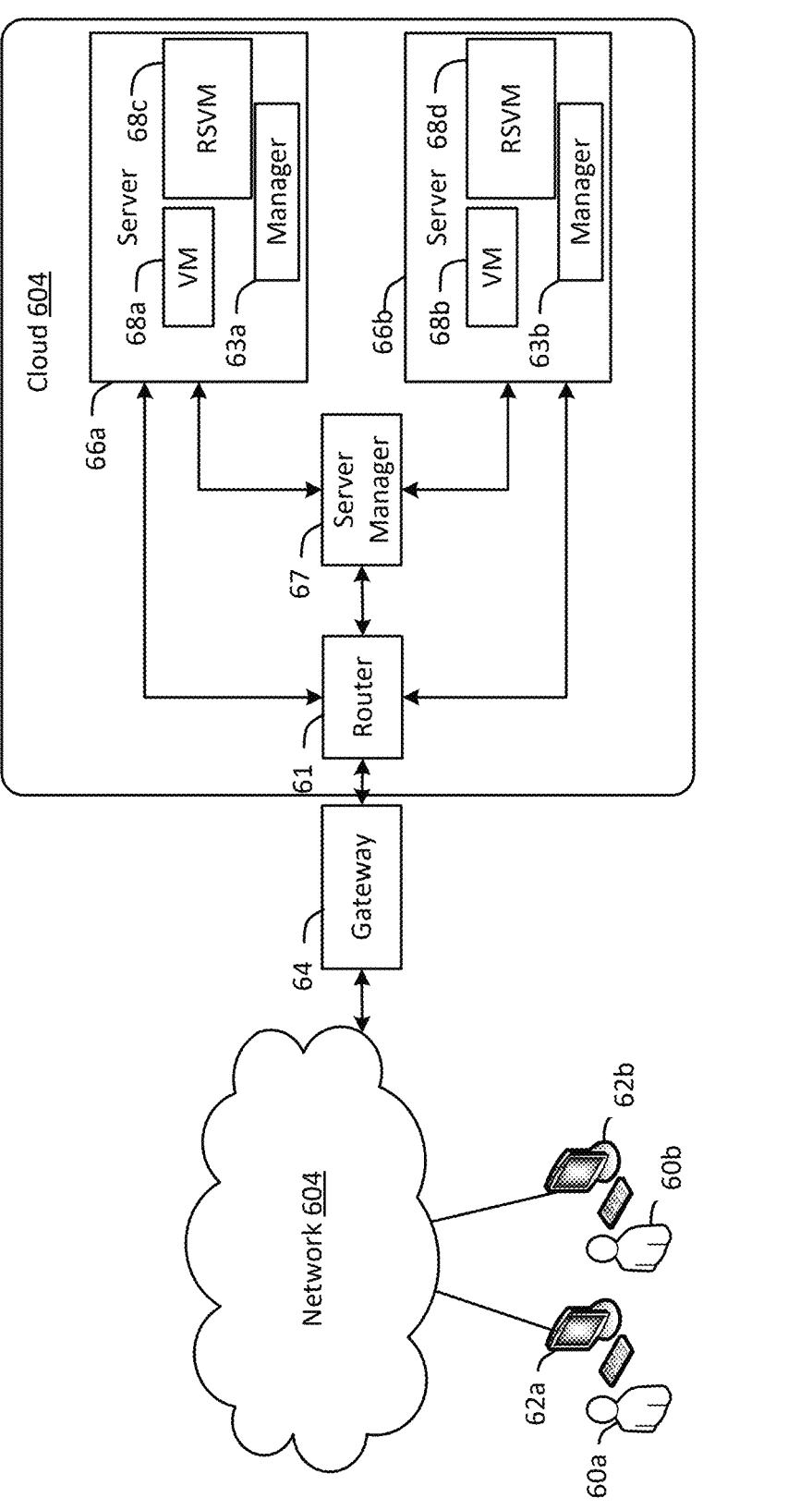
FIG. 8 is a diagram illustrating an example system for sending and providing data that may be used in accordance with the present disclosure.

An example system for sending and providing data that may be used to perform one or more of the various techniques described herein will now be described in detail. In particular, FIG. 8 illustrates an example computing environment in which the embodiments described herein may be implemented. For example, the computing environment of FIG. 8 may be an example of a cloud-based environment in which various end node devices (e.g., user computers 62a, 62b, etc.) communicate with a back-end distributed computing network (e.g., cloud 604) through one or more gateway devices (such as gateway 64). FIG. 8 is a diagram schematically illustrating an example of a cloud 604 (e.g., a data center) that can provide computing resources to users 60a and 60b (which may be referred herein singularly as user 60 or in the plural as users 60) via user computers 62a and 62b (which may be referred herein singularly as user computer 62 or in the plural as user computers 62) via a computer communication cloud 604. Cloud 604 may be configured to provide computing resources for executing applications on a permanent or an as-needed basis. The computing resources provided by cloud 604 may include various types of resources, such as gateway resources, load balancing resources, routing resources, networking resources, computing resources, volatile and non-volatile memory resources, content delivery resources, data processing resources, data storage resources, data communication resources, and the like. Each type of computing resource may be available in a number of specific configurations. For example, data processing resources may be available as virtual machine instances that may be configured to provide various web services. In addition, combinations of resources may be made available via a network and may be configured as one or more web services. The instances may be configured to execute applications, including web services, such as application services, media services, database services, processing services, gateway services, storage services, routing services, security services, encryption services, load balancing services, application services, and the like. In various examples, the instances may be configured to execute one or more of the various image processing techniques described herein.

These services may be configurable with set or custom applications and may be configurable in size, execution, cost, latency, type, duration, accessibility, and in any other dimension. These web services may be configured as available infrastructure for one or more clients and can include one or more applications configured as a platform or as software for one or more clients. These web services may be made available via one or more communications protocols. These communications protocols may include, for example, hypertext transfer protocol (HTTP) or non-HTTP protocols. These communications protocols may also include, for example, more reliable transport layer protocols, such as transmission control protocol (TCP), and less reliable transport layer protocols, such as user datagram protocol (UDP). Data storage resources may include file storage devices, block storage devices, and the like.

Each type or configuration of computing resource may be available in different sizes, such as large resources—consisting of many processors, large amounts of memory and/or large storage capacity—and small resources—consisting of fewer processors, smaller amounts of memory, and/or smaller storage capacity. Customers may choose to allocate a number of small processing resources as web servers and/or one large processing resource as a database server, for example.

Cloud 604 may include servers 66a and 66b (which may be referred herein singularly as server 66 or in the plural as servers 66) that provide computing resources. These resources may be available as bare metal resources or as virtual machine instances 68a-d (which may be referred herein singularly as virtual machine instance 68 or in the plural as virtual machine instances 68). In at least some examples, server manager 67 may control operation of and/or maintain servers 66. Virtual machine instances 68c and 68d are rendition switching virtual machine ("RSVM") instances. The RSVM virtual machine instances 68c and 68d may be configured to perform all, or any portion, of the techniques for improved rendition switching and/or any other of the disclosed techniques in accordance with the present disclosure and described in detail above. As should be appreciated, while the particular example illustrated in FIG. 6 includes one RSVM virtual machine in each server, this is merely an example. A server may include more than one RSVM virtual machine or may not include any RSVM virtual machines.

The availability of virtualization technologies for computing hardware has afforded benefits for providing large scale computing resources for customers and allowing computing resources to be efficiently and securely shared between multiple customers. For example, virtualization technologies may allow a physical computing device to be shared among multiple users by providing each user with one or more virtual machine instances hosted by the physical computing device. A virtual machine instance may be a software emulation of a particular physical computing system that acts as a distinct logical computing system. Such a virtual machine instance provides isolation among multiple operating systems sharing a given physical computing resource. Furthermore, some virtualization technologies may provide virtual resources that span one or more physical resources, such as a single virtual machine instance with multiple virtual processors that span multiple distinct physical computing systems.

Referring to FIG. 8, cloud 604 may, for example, be a publicly accessible network of linked networks and possibly operated by various distinct parties, such as the Internet. In other embodiments, cloud 604 may be a private network, such as a corporate or university network that is wholly or partially inaccessible to non-privileged users. In still other embodiments, cloud 604 may include one or more private networks with access to and/or from the Internet.

Cloud 604 may provide access to user computers 62. User computers 62 may be computers utilized by users 60 or other customers of cloud 604. For instance, user computer 62a or 62b may be a server, a desktop or laptop personal computer, a tablet computer, a wireless telephone, a personal digital assistant (PDA), an e-book reader, a game console, a set-top box, or any other computing device capable of accessing cloud 604. User computer 62a or 62b may connect directly to the Internet (e.g., via a cable modem or a Digital Subscriber Line (DSL)). Although only two user computers 62a and 62b are depicted, it should be appreciated that there may be multiple user computers.

User computers 62 may also be utilized to configure aspects of the computing resources provided by cloud 604. In this regard, cloud 604 might provide a gateway or web interface through which aspects of its operation may be configured through the use of a web browser application program executing on user computer 62. Alternately, a stand-alone application program executing on user computer 62 might access an application programming interface (API) exposed by cloud 604 for performing the configuration operations. Other mechanisms for configuring the operation of various web services available at cloud 604 might also be utilized.

Servers 66 shown in FIG. 8 may be servers configured appropriately for providing the computing resources described above and may provide computing resources for executing one or more web services and/or applications. In one embodiment, the computing resources may be virtual machine instances 68. In the example of virtual machine instances, each of the servers 66 may be configured to execute an instance manager 63*a* or 63*b* (which may be referred herein singularly as instance manager 63 or in the plural as instance managers 63) capable of executing the virtual machine instances 68. The instance managers 63 may be a virtual machine monitor (VMM) or another type of program configured to enable the execution of virtual machine instances 68 on server 66, for example. As discussed above, each of the virtual machine instances 68 may be configured to execute all or a portion of an application.

It should be appreciated that although the embodiments disclosed above discuss the context of virtual machine instances, other types of implementations can be utilized with the concepts and technologies disclosed herein. For example, the embodiments disclosed herein might also be utilized with computing systems that do not utilize virtual machine instances.

In the example cloud 604 shown in FIG. 8, a router 61 may be utilized to interconnect the servers 66*a* and 66*b*. Router 61 may also be connected to gateway 64, which is connected to cloud 604. Router 61 may be connected to one or more load balancers, and may, alone or in combination, manage communications within networks in cloud 604, for example, by forwarding packets or other data communications as appropriate based on characteristics of such communications (e.g., header information including source and/or destination addresses, protocol identifiers, size, processing requirements, etc.), and/or the characteristics of the private network (e.g., routes based on network topology, etc.). It will be appreciated that, for the sake of simplicity, various aspects of the computing systems and other devices of this example are illustrated without showing certain conventional details. Additional computing systems and other devices may be interconnected in other embodiments and may be interconnected in different ways.

In the example cloud 604 shown in FIG. 8, a cloud 604 is also employed to at least in part direct various communications to, from and/or between servers 66*a* and 66*b*. While FIG. 8 depicts router 61 positioned between gateway 64 and cloud 604, this is merely an exemplary configuration. In some cases, for example, cloud 604 may be positioned between gateway 64 and router 61. Cloud 604 may, in some cases, examine portions of incoming communications from user computers 62 to determine one or more appropriate servers 66 to receive and/or process the incoming communications. Cloud 604 may determine appropriate servers to receive and/or process the incoming communications based on factors such as an identity, location, or other attributes associated with user computers 62, a nature of a task with which the communications are associated, a priority of a task with which the communications are associated, a duration of a task with which the communications are associated, a size and/or estimated resource usage of a task with which the communications are associated, and many other factors. Cloud 604 may, for example, collect or otherwise have access to state information and other information associated with various tasks in order to, for example, assist in managing communications and other operations associated with such tasks.

It should be appreciated that the network topology illustrated in FIG. 8 has been greatly simplified and that many more networks and networking devices may be utilized to interconnect the various computing systems disclosed herein. These network topologies and devices should be apparent to those skilled in the art.

It should also be appreciated that cloud 604 described in FIG. 8 is merely illustrative and that other implementations might be utilized. It should also be appreciated that a server, gateway or other computing device may comprise any combination of hardware or software that can interact and perform the described types of functionality, including without limitation: desktop or other computers, database servers, network storage devices and other network devices, PDAs, tablets, cellphones, wireless phones, pagers, electronic organizers, Internet appliances, television-based systems (e.g., using set top boxes and/or personal/digital video recorders), and various other consumer products that include appropriate communication capabilities.

A network set up by an entity, such as a company or a public sector organization, to provide one or more web services (such as various types of cloud-based computing or storage) accessible via the Internet and/or other networks to a distributed set of clients may be termed a provider network. Such a provider network may include numerous data centers hosting various resource pools, such as collections of physical and/or virtualized computer servers, storage devices, networking equipment and the like, configured to implement and distribute the infrastructure, and web services offered by the provider network. The resources may in some embodiments be offered to clients in various units related to the web service, such as an amount of storage capacity for storage, processing capability for processing, as instances, as sets of related services, and the like. A virtual computing instance may, for example, comprise one or more servers with a specified computational capacity (which may be specified by indicating the type and number of CPUs, the main memory size and so on) and a specified software stack (e.g., a particular version of an operating system, which may in turn run on top of a hypervisor).

A number of different types of computing devices may be used singly or in combination to implement the resources of the provider network in different embodiments, for example, computer servers, storage devices, network devices, and the like. In some embodiments, a client or user may be provided direct access to a resource instance, e.g., by giving a user an administrator login and password. In other embodiments, the provider network operator may allow clients to specify execution requirements for specified client applications and schedule execution of the applications on behalf of the client on execution platforms (such as application server instances, Java™ virtual machines (JVMs), general-purpose or special-purpose operating systems, platforms that support various interpreted or compiled programming languages such as Ruby, Perl, Python, C, C++, and the like, or high-performance computing platforms) suitable for the applications, without, for example, requiring the client to access an instance or an execution platform directly. A given execution platform may utilize one or more resource instances in some implementations; in other implementations, multiple execution platforms may be mapped to a single resource instance.

In many environments, operators of provider networks that implement different types of virtualized computing, storage and/or other network-accessible functionality may allow customers to reserve or purchase access to resources in various resource acquisition modes. The computing resource provider may provide facilities for customers to select and launch the desired computing resources, deploy application components to the computing resources and maintain an application executing in the environment. In addition, the computing resource provider may provide further facilities for the customer to quickly and easily scale up or scale down the numbers and types of resources allocated to the application, either manually or through automatic scaling, as demand for or capacity requirements of the application change. The computing resources provided by the computing resource provider may be made available in discrete units, which may be referred to as instances. An instance may represent a physical server hardware platform, a virtual machine instance executing on a server or some combination of the two. Various types and configurations of instances may be made available, including different sizes of resources executing different operating systems (OS) and/or hypervisors, and with various installed software applications, runtimes and the like. Instances may further be available in specific availability zones, representing a logical region, a fault tolerant region, a data center or other geographic location of the underlying computing hardware, for example. Instances may be copied within an availability zone or across availability zones to improve the redundancy of the instance, and instances may be migrated within a particular availability zone or across availability zones. As one example, the latency for client communications with a particular server in an availability zone may be less than the latency for client communications with a different server. As such, an instance may be migrated from the higher latency server to the lower latency server to improve the overall client experience.

In some embodiments, the provider network may be organized into a plurality of geographical regions, and each region may include one or more availability zones. An availability zone (which may also be referred to as an availability container) in turn may comprise one or more distinct locations or data centers, configured in such a way that the resources in a given availability zone may be isolated or insulated from failures in other availability zones. That is, a failure in one availability zone may not be expected to result in a failure in any other availability zone. Thus, the availability profile of a resource instance is intended to be independent of the availability profile of a resource instance in a different availability zone. Clients may be able to protect their applications from failures at a single location by launching multiple application instances in respective availability zones. At the same time, in some implementations inexpensive and low latency network connectivity may be provided between resource instances that reside within the same geographical region (and network transmissions between resources of the same availability zone may be even faster).

Although various systems described herein may be embodied in software or code executed by general purpose hardware as discussed above, as an alternate the same may also be embodied in dedicated hardware or a combination of software/general purpose hardware and dedicated hardware.

If embodied in dedicated hardware, each can be implemented as a circuit or state machine that employs any one of or a combination of a number of technologies. These technologies may include, but are not limited to, discrete logic circuits having logic gates for implementing various logic functions upon an application of one or more data signals, application specific integrated circuits having appropriate logic gates, or other components, etc. Such technologies are generally well known by those of ordinary skill in the art and consequently, are not described in detail herein.

The flowcharts and methods described herein show the functionality and operation of various implementations. If embodied in software, each block or step may represent a module, segment, or portion of code that comprises program instructions to implement the specified logical function(s). The program instructions may be embodied in the form of source code that comprises human-readable statements written in a programming language or machine code that comprises numerical instructions recognizable by a suitable execution system such as a processing component in a computer system. If embodied in hardware, each block may represent a circuit or a number of interconnected circuits to implement the specified logical function(s).

Although the flowcharts and methods described herein may describe a specific order of execution, it is understood that the order of execution may differ from that which is described. For example, the order of execution of two or more blocks or steps may be scrambled relative to the order described. Also, two or more blocks or steps may be executed concurrently or with partial concurrence. Further, in some embodiments, one or more of the blocks or steps may be skipped or omitted. It is understood that all such variations are within the scope of the present disclosure.

Also, any logic or application described herein that comprises software or code can be embodied in any non-transitory computer-readable medium or memory for use by or in connection with an instruction execution system such as a processing component in a computer system. In this sense, the logic may comprise, for example, statements including instructions and declarations that can be fetched from the computer-readable medium and executed by the instruction execution system. In the context of the present disclosure, a "computer-readable medium" can be any medium that can contain, store, or maintain the logic or application described herein for use by or in connection with the instruction execution system. The computer-readable medium can comprise any one of many physical media such as magnetic, optical, or semiconductor media. More specific examples of a suitable computer-readable media include, but are not limited to, magnetic tapes, magnetic floppy diskettes, magnetic hard drives, memory cards, solid-state drives, USB flash drives, or optical discs. Also, the computer-readable medium may be a random access memory (RAM) including, for example, static random access memory (SRAM) and dynamic random access memory (DRAM), or magnetic random access memory (MRAM). In addition, the computer-readable medium may be a read-only memory (ROM), a programmable read-only memory (PROM), an erasable programmable read-only memory (EPROM), an electrically erasable programmable read-only memory (EEPROM), or other type of memory device.

It should be emphasized that the above-described embodiments of the present disclosure are merely possible examples of implementations set forth for a clear understanding of the principles of the disclosure. Many variations and modifications may be made to the above-described example(s) without departing substantially from the spirit and principles of the disclosure. All such modifications and variations are intended to be included herein within the scope of this disclosure and protected by the following claims.

What is claimed is:

1. An electronic device comprising:

a wireless transceiver;

one or more processors; and one or more computer readable media storing computer executable instructions that, when executed by the one or more processors of the electronic device, cause the electronic device to perform operations comprising:

determining a first number of devices located proximate the electronic device, determining, at a first time, a first signal strength value, determining, based on the first signal strength value, a first interference value, based on the first interference value, transmitting:

first data indicating that the electronic device is switching to a frequency hopping scheme, and second data indicating a second number of channels to use for frequency hopping, wherein the second number of channels to use for frequency hopping was determined based on the first number of devices, receiving, using the wireless transceiver, one or more signals transmitted by another device, determining, based on the one or more signals, a second signal strength value, comparing the second signal strength value to a threshold, and based on the comparing of the second signal strength value to the threshold, determining that the another device is located proximate the electronic device, wherein the determining of the first number is based on the determining that the another device is located proximate the electronic device.

2. The electronic device of claim 1, wherein the one or more computer readable media store computer executable instructions that, when executed by the one or more processors of the electronic device, cause the electronic device to perform operations comprising:

determining, based on the first number of devices, the second number of channels.

3. The electronic device of claim 1, wherein the one or more computer readable media store computer executable instructions that, when executed by the one or more processors of the electronic device, cause the electronic device to perform operations comprising:

sending, to a remote system, third data indicating the first number of devices located proximate to the electronic device; and receiving, from the remote system, fourth data indicating the second number of channels to use for frequency hopping.

4. The electronic device of claim 1, wherein the first number of devices is a first number of gateway devices.

5. The electronic device of claim 1, wherein the first number of devices is a first number of gateway devices and wherein the electronic device comprises one or more computer readable media store computer executable instructions that, when executed by the one or more processors of the electronic device, cause the electronic device to perform operations comprising determining a third number of end devices.

6. The electronic device of claim 1, wherein the first number of devices is a first number of gateway devices and wherein the electronic device comprises one or more computer readable media store computer executable instructions that, when executed by the one or more processors of the electronic device, cause the electronic device to perform operations comprising:

determining a third number of end devices located proximate the electronic device; and sending, to a remote system, third data indicating the third number of end devices.

7. An electronic device comprising:

a wireless transceiver;

one or more processors; and one or more computer readable media storing computer executable instructions that, when executed by the one or more processors of the electronic device, cause the electronic device to perform operations comprising:

determining a first number of devices located proximate the electronic device;

determining, at a first time, a first signal strength value;

determining, based on the first signal strength value, a first interference value;

based on the first interference value, transmitting:

first data indicating that the electronic device is switching to a frequency hopping scheme, and second data indicating a second number of channels to use for frequency hopping, wherein the second number of channels to use for frequency hopping was determined based on the first number of devices;

receiving, using the wireless transceiver, one or more signals transmitted by another device;

determining, based on the one or more signals, a second signal strength value;

determining, based on the second signal strength value, a first distance to the another device;

comparing the first distance to a threshold; and based on the comparing of the first distance to the threshold, determining that the another device is located proximate the electronic device;

wherein the determining of the first number is based on the determining that the another device is located proximate the electronic device.

8. The electronic device of claim 7, wherein the determining of the first distance is based on a path loss exponent determined by the electronic device.

9. The electronic device of claim 7, wherein the determining of the first distance is based on a path loss exponent received from a remote system.

10. An electronic device comprising:

a wireless transceiver;

one or more processors; and one or more computer readable media storing computer executable instructions that, when executed by the one or more processors of the electronic device, cause the electronic device to perform operations comprising:

determining, based on a plurality of signal strength values, a first number of client devices located proximate the electronic device, sending, to a remote system, first data indicating the first number of client devices located proximate the electronic device, receiving, from the remote system, second data indicating a plurality of wireless channels, determining, at a first time, a first signal strength value, determining, based on the first signal strength value, a first interference value, based on the first interference value and the second data, sending third data indicating one or more wireless channels of the plurality of wireless channels, and receiving fourth data over one of the one or more wireless channels.

11. The electronic device of claim 10, wherein the one or more computer readable media store computer executable instructions that, when executed by the one or more processors of the electronic device, cause the electronic device to perform operations comprising:

receiving, using the wireless transceiver, one or more signals transmitted by a first client device;

determining, based on the one or more signals, a second signal strength value;

determining, based on the second signal strength value, a first distance to the first client device;

comparing the first distance to a threshold; and based on the comparing of the first distance to the threshold, determining that the first client device is located proximate the electronic device;

wherein the determining of the first number is based on the determining that the first client device is located proximate the electronic device.

12. The electronic device of claim 10, wherein the one or more computer readable media store computer executable instructions that, when executed by the one or more processors of the electronic device, cause the electronic device to perform operations comprising:

receiving, using the wireless transceiver, one or more signals transmitted by a first client device;

determining, based on the one or more signals, a second signal strength value;

comparing the second signal strength value to a threshold; and based on the comparing of the second signal strength value to the threshold, determining that the first client device is located proximate the electronic device;

wherein the determining of the first number is based on the determining that the first client device is located proximate the electronic device.

13. An electronic device comprising:

a wireless transceiver;

one or more processors; and one or more computer readable media storing computer executable instructions that, when executed by the one or more processors of the electronic device, cause the electronic device to perform operations comprising:

determining, based on a plurality of signal strength values, a first number of devices located proximate the electronic device, determining, at a first time, a first signal strength value, determining, based on the first signal strength value, a first interference value, and based on the first interference value, sending to a first device first data indicating a first wireless channel and a first modulation scheme involving use of chirps having an increasing frequency, and sending to a second device second data indicating the first wireless channel and a second modulation scheme involving use of chirps having a decreasing frequency.

14. The electronic device of claim 13, wherein the one or more computer readable media store computer executable instructions that, when executed by the one or more processors of the electronic device, cause the electronic device to perform operations comprising:

receiving, using the wireless transceiver, one or more signals transmitted by another device;

determining, based on the one or more signals, a second signal strength value;

comparing the second signal strength value to a threshold; and based on the comparing of the second signal strength value to the threshold, determining that the another device is located proximate the electronic device;

wherein the determining of the first number is based on the determining that the another device is located proximate the electronic device.

15. The electronic device of claim 13, wherein the one or more computer readable media store computer executable instructions that, when executed by the one or more processors of the electronic device, cause the electronic device to perform operations comprising:

receiving, using the wireless transceiver, one or more signals transmitted by another device;

determining, based on the one or more signals, a second signal strength value;

determining, based on the second signal strength value, a first distance to the another device;

comparing the first distance to a threshold; and based on the comparing of the first distance to the threshold, determining that the another device is located proximate the electronic device;

wherein the determining of the first number is based on the determining that the another device is located proximate the electronic device.

16. The electronic device of claim 15, wherein the determining of the first distance is based on a path loss exponent determined by the electronic device.

17. A method comprising:

determining a first number of devices located proximate a first gateway device;

determining first interference data for the first gateway device;

switching from a first wireless transmission scheme to a frequency hopping wireless transmission scheme based on the first interference data; and sending, by the first gateway device, first instructions to a first remote computing device, wherein the first instructions indicate that the first gateway device is switching to the frequency hopping wireless transmission scheme and indicate a second number of channels to use for frequency hopping, wherein the second number of channels is based on the first number of devices.

18. The method of claim 17, further comprising:

determining identifier data for the first remote computing device; and determining, using the identifier data and a global clock signal, a first wireless communication channel for communication with the first remote computing device during a first time period of the frequency hopping wireless transmission scheme.

19. The method of claim 18, wherein the first time period corresponds to a time at which the first remote computing device powers a receiver for receiving wireless communications.

20. The method of claim 17, further comprising:

determining a first set of remote computing devices having a first preference status for wireless communication;

determining a second set of remote computing devices having a second preference status for wireless communication;

assigning a first number of channels for the frequency hopping wireless transmission scheme to the first set of remote computing devices based at least in part on the first preference status and the second preference status; and assigning a second number of channels for the frequency hopping wireless transmission scheme to the second set of remote computing devices based at least in part on the first preference status and the second preference status, wherein the first number of channels is different from the second number of channels.

21. The method of claim 17, further comprising:

determining second interference data for the first gateway device; and switching from the frequency hopping wireless transmission scheme to a static wireless transmission scheme based on the second interference data.

22. The method of claim 21, further comprising sending, by the first gateway device, second instructions to the first remote computing device during a first time at which the first remote computing device powers a receiver, the second instructions instructing the first remote computing device to switch from the frequency hopping wireless transmission scheme to the static wireless transmission scheme.

23. The method of claim 17, wherein the first gateway device and the first remote computing device independently determine channels to use for the frequency hopping wireless transmission scheme based on identifier data identifying the first remote computing device.

24. The method of claim 17, wherein determining the first interference data comprises determining a carrier to interference ratio for the first gateway device.

* * * * *